United States Patent
Dobermann

(10) Patent No.: US 12,386,135 B2
(45) Date of Patent: Aug. 12, 2025

(54) JOINT GUIDING OF MOVABLE OPTICAL ELEMENTS

(71) Applicant: Carl Zeiss AG, Oberkochen (DE)

(72) Inventor: Dirk Dobermann, Weimar (DE)

(73) Assignee: Carl Zeiss AG, Oberkochen (DE)

( * ) Notice: Subject to any disclaimer, the term of this patent is extended or adjusted under 35 U.S.C. 154(b) by 719 days.

(21) Appl. No.: 17/733,816

(22) Filed: Apr. 29, 2022

(65) Prior Publication Data

US 2022/0252821 A1 Aug. 11, 2022

Related U.S. Application Data

(63) Continuation of application No. PCT/EP2020/078633, filed on Oct. 12, 2020.

(30) Foreign Application Priority Data

Oct. 31, 2019 (DE) ...................... 10 2019 129 445.2

(51) Int. Cl.
G02B 7/00 (2021.01)
G02B 7/02 (2021.01)
G03B 13/34 (2021.01)

(52) U.S. Cl.
CPC ............. G02B 7/005 (2013.01); G02B 7/023 (2013.01); G03B 13/34 (2013.01)

(58) Field of Classification Search
CPC .... G02B 7/005; G02B 7/023; G02B 27/0075; G02B 7/003; G03B 13/34
See application file for complete search history.

(56) References Cited

U.S. PATENT DOCUMENTS 3,305,294 A 2/1967 Alvarez
5,003,401 A 3/1991 Otsuka
(Continued)

FOREIGN PATENT DOCUMENTS

DE 40 01 745 A1 8/1990
DE 10 2008 001 892 A1 11/2009
(Continued)

OTHER PUBLICATIONS

International Search Report dated Feb. 15, 2021 of international application PCT/EP2020/078633 on which this application is based.
(Continued)

*Primary Examiner* — James C. Jones
(74) *Attorney, Agent, or Firm* — Walter Ottesen, P.A.

(57) ABSTRACT

A guide component for joint guidance of at least two optical elements that are movable in relation to one another is described. The guide component comprises at least two separate planar sliding guide surfaces arranged with a fixed spatial alignment relative to one another, a first sliding guide surface comprising a first surface normal and being configured to rest against and slidingly guide a first optical element in relation to a second optical element, and a second sliding guide surface comprising a second surface normal and being configured to rest against and slidingly guide the second optical element in relation to the first optical element, the first surface normal and the second surface normal running parallel to one another in opposite directions.

22 Claims, 12 Drawing Sheets

(56) References Cited

U.S. PATENT DOCUMENTS

| | | | |
|---|---|---|---|
| 2010/0118402 A1* | 5/2010 | Washisu | H04N 23/68 |
| | | | 359/557 |
| 2011/0069295 A1 | 3/2011 | Kraehmer et al. | |
| 2012/0257278 A1 | 10/2012 | Simonov et al. | |
| 2013/0278911 A1 | 10/2013 | Limbach et al. | |
| 2016/0131900 A1 | 5/2016 | Pretorius | |
| 2017/0227747 A1 | 8/2017 | Zhou et al. | |
| 2017/0307860 A1 | 10/2017 | Pretorius et al. | |

FOREIGN PATENT DOCUMENTS

| | | |
|---|---|---|
| DE | 10 2013 101 711 A1 | 8/2014 |
| DE | 10 2014 118 383 A1 | 6/2016 |
| DE | 10 2015 116 895 B3 | 11/2016 |
| EP | 3 195 050 A1 | 7/2017 |
| WO | 2007/037691 A2 | 4/2007 |
| WO | 2008/143331 A1 | 11/2008 |
| WO | 2011/019283 A1 | 2/2011 |

OTHER PUBLICATIONS

Translation and search report of the German Patent Office dated Jun. 30, 2020 of German patent application 10 2019 129 445.2 from which this application claims priority.

Translation of the International Preliminary Report on Patentability and Written Opinion dated May 12, 2022 of International application PCT/EP2020/078633 on which this application is based.

* cited by examiner

JOINT GUIDING OF MOVABLE OPTICAL ELEMENTS

CROSS REFERENCE TO RELATED APPLICATIONS

This application is a continuation application of international patent application PCT/EP2020/078633, filed Oct. 12, 2020 designating the United States and claiming priority from German application 10 2019 129 445.2, filed Oct. 31, 2019, and the entire content of both applications is incorporated herein by reference.

TECHNICAL FIELD

The present disclosure relates to a guide component for joint guidance of at least two optical elements that are movable in relation to one another, for example movable by translation and/or rotation. Additionally, the disclosure relates to an optical element, an optical assembly, a method for operating an optical assembly, a wavefront manipulator and an optical device. Moreover, the disclosure relates to a method for producing a guide component, and to a method for producing an optical element.

BACKGROUND

To add to the function of optical systems, optical assemblies can be used which have two optical elements which are displaceable relative to one another with respect to the optical axis, in particular two optical elements which are displaceable relative to one another perpendicular to the optical axis. The displaceable optical elements can also be elements with free-form surfaces, which are sometimes referred to as Alvarez elements. Optical systems having such assemblies are described, for example, in WO 2007/037691 A2, US 2017/0227747 A1, and US 2013/0278911 A1. With the aid of optical elements having free-form surfaces, it is possible to correct for example aberrations for different focal planes in a targeted manner, as is described in US 2016/0131900. In addition, optical elements with free-form surfaces that are displaceable perpendicular to the optical axis also offer the possibility of deliberately introducing aberrations into an optical system, for example to bring about a soft focus effect in a photo lens. This is described, for example, in US 2017/0307860. A similar use of optical elements with free-form surfaces that are displaceable perpendicular to the optical axis is described in DE 10 2015 116 895 B3.

U.S. Pat. No. 3,305,294 by Luis W. Alvarez describes optical elements with at least a first optical component part and a second optical component part, which are arranged one behind the other along an optical axis, each have a refractive free-form surface and are displaceable with respect to one another perpendicular to the optical axis. The refractive power effect of an optical element made up of the two component parts can be varied by lateral displacement of the optical component parts having the free-form surfaces. Such optical elements are therefore also called zoom lenses or Alvarez elements.

By way of example, Alvarez elements are used for focusing, zooming and generating "artistic" effects. By way of example, the bokeh of a filmed scene can be set and altered very precisely by influencing the depth of field in a targeted manner. Another option includes the aforementioned soft focusing of certain spatial frequencies in the recording. Consequently, the user can blur or smooth certain elements and structures in the image directly during the recording.

The movement when displacing the optical elements perpendicular to the optical axis is often only by a few millimeters. Very high demands are placed on the movement in terms of its guidance accuracy. In the case of a travel of more than 3 mm, the deviation should typically be less than 1 µm. To achieve this, both the position and the guide path of each optical element are adjusted relative to the optical system. Since the adjustment of the guide path of an optical element influences its position and vice versa, there must be coupled adjustment points, which complicates the adjustment.

Furthermore, the adjustment elements, such as adjustment screws, remain in the optical system after the adjustment has been completed. The result is an increased space requirement. In addition, settling phenomena occurring during the service life of the optical system can make readjustment necessary. The adjustment described is therefore complex and cost-intensive and is thus suitable only to a limited extent for series production.

SUMMARY

A first object of the present disclosure is to provide an advantageous guide component for joint guidance of at least two optical elements that are movable in relation to one another, the guide component having a high guidance accuracy, especially also in the case of large travels, moreover being easy to adjust and simultaneously being robust vis-à-vis jolts, tremors, vibrations and temperature variations, and moreover requiring a reduced installation space. Further objects include providing an advantageous optical element and an advantageous optical assembly, an advantageous wavefront manipulator and an optical device having the aforementioned advantages. Additionally, a further object includes providing a method for operating an optical assembly, a wavefront manipulator and an optical device with the same advantages. Moreover, it is a further object of the present disclosure to provide a method for producing a guide component according to the disclosure and a method for producing an optical element according to the disclosure.

The first object can, for example, be achieved by a guide component for joint guidance of at least two optical elements that are movable in relation to one another, the at least two optical elements including a first optical element and a second optical element. The guide component includes: at least two separate planar sliding guide surfaces arranged with a fixed spatial alignment relative to one another; the at least two separate planar sliding guide surfaces including a first sliding guide surface defining a first surface normal and configured to rest against and slidingly guide the first optical element in relation to the second optical element; the at least two separate planar sliding guide surfaces further including a second sliding guide surface defining a second surface normal and configured to rest against and slidingly guide the second optical element in relation to the first optical element; and, the first surface normal and the second surface normal running parallel to one another in opposite directions.

A further object can, for example, be achieved by an optical assembly including: a first optical element and a second optical element movable in a jointly guided manner and moveable in relation to one another; a guide component including at least two separate planar sliding guide surfaces arranged with a fixed spatial alignment relative to one another; the at least two separate planar sliding guide surfaces including a first sliding guide surface defining a first surface normal and configured to rest against and slidingly guide the first optical element in relation to the second optical element; the at least two separate planar sliding guide surfaces further including a second sliding guide surface defining a second surface normal and configured to rest against and slidingly guide the second optical element in relation to the first optical element; the first surface normal and the second surface normal running parallel to one another in opposite directions; the first optical element including a first optical element sliding guide surface for sliding along the first sliding guide surface; the second optical element including a second optical element sliding guide surface for sliding along the second sliding guide surface; and, the first optical element and the second optical element being configured to be jointly moveable in a guided manner via the guide component and to be moved in relation to one another via corresponding ones of the first sliding guide surface and the second sliding guide surface.

A further object can, for example, be achieved by a method for operating an optical assembly according to the disclosure having a first optical element and a second optical element movable in a jointly guided manner and moveable in relation to one another. The optical assembly further has a guide component including at least two separate planar sliding guide surfaces arranged with a fixed spatial alignment relative to one another; the at least two separate planar sliding guide surfaces including a first sliding guide surface defining a first surface normal and configured to rest against and slidingly guide the first optical element in relation to the second optical element; the at least two separate planar sliding guide surfaces further including a second sliding guide surface defining a second surface normal and configured to rest against and slidingly guide the second optical element in relation to the first optical element; the first surface normal and the second surface normal running parallel to one another in opposite directions; the first optical element including a first optical element sliding guide surface for sliding along the first sliding guide surface; the second optical element including a second optical element sliding guide surface for sliding along the second sliding guide surface; the first optical element and the second optical element being configured to be jointly moveable in a guided manner via the guide component and to be moved in relation to one another via corresponding ones of the first sliding guide surface and the second sliding guide surface. The method includes at least one of: jointly moving the first optical element and the second optical element in a guided manner via the guide component; and, moving the first optical element in a guided manner in relation to the second optical element by sliding the first optical element along the first sliding guide surface.

A guide component according to the disclosure for joint guidance of at least two optical elements that are movable in relation to one another, for example movable by way of translation and/or rotation, includes at least two separate or spaced apart planar sliding guide surfaces. Sliding guide surfaces are understood to mean surfaces for guiding components by way of a sliding movement of same along the surface, that is, under the influence of sliding friction. The at least two sliding guide surfaces are arranged with a fixed spatial position and alignment with respect to one another.

In this case, fixed spatially can preferably mean that the geometric positions of the sliding guide surfaces with respect to one another and their alignments cannot be reversibly changed by a user. Thus, a change would require an irreversible impact on the guide component.

A first sliding guide surface includes a first surface normal. A second sliding guide surface includes a second surface normal. The first sliding guide surface is configured to rest against and slidingly guide a first optical element in relation to a second optical element. The second sliding guide surface is configured to rest against and slidingly guide the second optical element in relation to the first optical element. The first surface normal and the second surface normal run parallel to one another in opposite directions. Thus, the first sliding guide surface can be arranged facing away from, or facing, the second sliding guide surface on one and the same guide component.

A guide component according to the disclosure can advantageously be embodied in one piece. Preferably, it is configured to be arranged between the at least two optical elements. Advantageously, each sliding guide surface is configured to rest against only one of the optical elements. Expressed differently, the first sliding guide surface is configured to rest only against the first optical element and not against the second, and the second sliding guide surface is configured to rest only against the second optical element and not against the first.

A guide component according to the disclosure is advantageous in that it facilitates particularly accurate guides, preferably linear guides, for the adjustment of optical elements, in particular optical free-form element pairs, for example pairwise Alvarez elements. In this case, the peculiarity consists of the fact that the guiding straight line is formed by the guide component jointly used by a plurality of optical elements, with guidance of the individual optical elements not making use of the same sliding guide surfaces. Preferably, as will be explained below within the scope of a production method according to the disclosure, the various sliding guide surfaces of the guide component jointly used by a plurality of optical elements are produced in one manufacturing run, that is, in particular under common chucking, and are therefore matched very accurately to one another in respect of their relative position and shape. Guide accuracies of 10 µm and less can be realized in this way, even in the case of relatively large travels of ±5 mm and more.

A further advantage includes the fact that a guide component according to the disclosure is able to be realized with a very small number of structural elements since guidance is implemented directly by the guide component and corresponding guide surfaces of the utilized optical elements. Hence, there is no need for adjustment elements which remain in a corresponding assembly and require additional installation space. As a rule, adjustment elements represent a weak point which in turn needs to be secured against a possible outage, for example as a consequence of settling phenomena. Moreover, on account of the planar embodiment of the sliding guide surfaces, the guide is particularly insensitive to jolts and vibrations. This facilitates the use in products, such as in particular cine and camera lenses, which need to withstand tremors of the order of up to 10 times the gravitational acceleration and temperature variations ranging from −20 degrees Celsius to +25 degrees Celsius.

In an advantageous variant, at least one further guide surface is present, for example in the form of a sliding guide surface and/or rolling-element guide surface. It can be configured as a planar surface or as a curved surface, for example an arcuately curved surface, in particular a cylinder jacket surface, for example as an outer surface of a pin. A further guide surface for each optical element to be guided is advantageous in that this can make available a stop in a second direction.

By way of example, a guide component may include two sliding guide surfaces, expressed differently a first guiding surface pair, which form a stop for the optical elements in a first direction, for example in a z-direction of a Cartesian coordinate system. Additionally, the guide component may include two further guide surfaces, for example sliding guide surfaces and/or rolling-element guide surfaces, that is, a second guiding surface pair, which form a stop for the optical elements in a second direction, for example a y-direction of a Cartesian coordinate system. In this case, the second direction may run perpendicular to the first direction, like in the example of the specified Cartesian coordinate system. In this example, the optical elements to be guided can be moved in guided fashion in the x-direction of a Cartesian coordinate system. The guided movement is achieved by virtue of the fact that the respective optical element to be guided firstly slides along a sliding guide surface that forms a stop in the z-direction and is moved along a guide surface that forms a stop in the y-direction while it is moved in the x-direction in translational fashion.

Advantageously, at least one of the aforementioned sliding guide surfaces, preferably each sliding guide surface, is at least partly coated with a slide-promoting plastic. This facilitates guidance by a sliding movement with a coefficient of sliding friction that is as low as possible. By way of example, use can be made of the ZX100 slide-promoting plastic on the sliding guide surfaces.

By way of example, the at least one further guide surface can be embodied as the surface of a polished ceramic beam or as the outer surface of a pin.

The optical elements to be guided via the guide component can be either transmissive optical elements or reflective optical elements. Preferably, a guide component according to the disclosure is configured to guide two optical elements that are matched to one another, for example to guide an optical free-form element pair, that is, an Alvarez element pair in particular. In further variants, the optical elements that can move in relation to one another may include at least one changeable stop and/or at least one gap and/or at least one target marker and/or at least one optical grating and/or at least one wedge and/or at least one plane plate and/or at least one prism and/or at least one lens. In principle, any optical elements that need to be guided precisely in relation to one another and, additionally and/or simultaneously, need to be guided together in precise fashion can be used in an application of a guide component according to the disclosure.

An optical element according to the disclosure, which may be a transmissive optical element or reflective optical element, for example one of the aforementioned optical elements, includes at least one sliding guide surface for guiding the optical element along a sliding guide surface of an above-described guide component according to the disclosure. In this case, the surface for guiding the optical element may be at least partly coated with a slide-promoting plastic. By way of example, use can be made of the ZX100 slide-promoting plastic on the sliding guide surfaces.

In a first variant, an optical element according to the disclosure includes a mount, the sliding guide surface for guiding the optical element forming a portion of the mount or forming a partial surface of the mount or being arranged on the mount. In this way, in view of its features and optical properties, the optical element to be guided can be aligned precisely in view of the direction in which it should be guided. In particular, no further adjustment of the optical element is required in this way.

In a further variant, the optical element may include an optically effective structural element or a structural element that has the optically relevant properties. In this variant, the optically effective structural element includes the sliding guide surface for guiding the optical element. Expressed differently, the sliding guide surface can be embodied as a portion of the optically effective structural element, in particular of the optically effective material. This embodiment is advantageous in that there is no need for an additional mount for the purposes of guiding the optical element and, moreover, there is no need for a subsequent adjustment of the optical element within the mount or subsequent adjustment of the optical element in relation to the direction in which it should be guided.

An optical element according to the disclosure may include at least one optical free-form element, for example an Alvarez element, and/or at least one changeable stop and/or at least one gap and/or at least one target marker and/or at least one optical grating and/or at least one wedge and/or at least one plane plate and/or at least one prism and/or at least one lens.

A free-form surface is understood in the broader sense to be a complex surface that can be represented in particular via regionally defined functions, in particular twice continuously differentiable regionally defined functions. Examples of suitable regionally defined functions are (in particular piecewise) polynomial functions (in particular polynomial splines, for example bicubic splines, higher order splines of fourth order or higher, or polynomial non-uniform rational B-splines (NURBS)). These are to be distinguished from simple surfaces, such as spherical surfaces, aspherical surfaces, cylindrical surfaces, toric surfaces, which are described as a circle at least along a main meridian. In particular, a free-form surface need not have axial symmetry and need not have point symmetry and can have different values for the mean surface power value in different regions of the surface. As a rule, a free-form surface is produced on an optical element by machining the optical element, that is, for example, by milling, or within the scope of a CNC method, in which the free-form surface is produced under numerical control on the basis of a mathematical description of the surface. However, it is also possible to precise-press the free form. To this end, the negative mold must be processed with appropriate additives for temperature-dependent shrinkage by way of CNC methods.

In summary, the optical element according to the disclosure is advantageous in that it requires minimal installation space and need not be subsequently adjusted in relation to its guidance or movement direction. Moreover, it has a simple and robust structure.

The optical assembly according to the disclosure includes at least two optical elements movable in joint guided fashion and movable in relation to one another in guided fashion. The optical assembly according to the disclosure includes at least one above-described guide component according to the disclosure and at least one first above-described optical element according to the disclosure and at least one second optical element according to the disclosure. The first optical element rests against the first sliding guide surface of the guide component. The second optical element rests against the second sliding guide surface of the guide component. The first optical element and the second optical element are movable in joint guided fashion via the guide component. Moreover, they are movable in relation to one another in guided fashion as a result of sliding along the sliding guide surface. Preferably, the optical elements are arranged in succession along an optical axis and are arranged to be movable parallel to one another parallel to a plane running perpendicular to the optical axis.

The optical assembly according to the disclosure has the features and advantages already specified in conjunction with the guide component according to the disclosure and the optical element according to the disclosure. Preferably, the first optical element and the second optical element are optical elements that are matched to one another, for example an optical free-form element pair, in particular an Alvarez element pair. Advantageously, further guide surfaces are present in addition to the aforementioned sliding guide surfaces, for example sliding and/or rolling-element guide surfaces. These may form stops and/or guide rails in view of at least one further direction.

In principle, the guided movements of both the guide component and the optical elements in relation to one another can be translational movements and/or rotational movements, preferably movements perpendicular to an optical axis.

In an advantageous variant, the optical assembly includes at least one drive for moving at least one of the optical elements in relation to the guide component. Additionally or as an alternative, the drive may in this case be embodied to move the optical elements in relation to one another, that is, for example, to move the first optical element in relation to the second optical element, or vice versa.

A respective drive can be available for each optical element to be guided, for example for each free-form element. As a result, only the zero position needs to be adjusted within the scope of adjustments, reducing the adjustment time. Moreover, the travel can be corrected separately for each optical element, in particular for each optical free-form element.

The drive may include a piezo-drive and/or an electric motor and/or a gearing. In this case, the drive may include for example a piezo-walk drive and/or a rotational piezo-ultrasonic motor (also referred to as a traveling wave motor) and/or a linear piezo-ultrasonic motor or drive and/or a DC motor and/or a stepper motor. Additionally or as an alternative, the drive may include a rack-and-pinion gear and/or a lever-type gear. With the aid of the aforementioned structural elements for a drive, it is possible to realize a drive adapted to the requirements of the respective application. In particular, the required travel, the available installation space, the sought-after adjustment precision and the sought-after adjustment time may be taken into account on an individual basis in the process.

The wavefront manipulator according to the disclosure for manipulating the wavefront of an electromagnetic wave includes an above-described optical assembly according to the disclosure for manipulating the wavefront. It has the features and advantages specified in conjunction with the optical assembly according to the disclosure and the component parts thereof. For this purpose, the optical elements of the optical assembly can in particular be provided with free-form surfaces.

The optical device according to the disclosure includes an above-described optical assembly according to the disclosure and/or an above-described wavefront manipulator according to the disclosure. It likewise has the features and advantages already mentioned above. The optical device according to the disclosure can be for example a waveguide or a lens, in particular a cine lens and/or a camera lens. It may also relate to a camera or an optical observation device or a display apparatus. By way of example, the camera can be a photographic camera and/or a cine camera and/or a microscope camera. By way of example, the display apparatus can be a projector or a head-up display or a display apparatus configured for a microscope. The optical device according to the disclosure is advantageous in that the wavefront manipulator according to the disclosure renders it suitable, for example, for focusing and/or for generating special effects, for example for soft focusing or for generating a defined blur.

The method according to the disclosure for operating an above-described optical assembly according to the disclosure is distinguished in that the first optical element and the second optical element are jointly guided via the guide component, for example by way of a translational movement and/or a rotational movement. Additionally or as an alternative, at least one of the first and the second optical element is moved in guided fashion in relation to the other optical element by sliding along the at least one sliding guide surface. Thus, for example, the first optical element is moved in guided fashion in relation to the second optical element and/or the second optical element is moved in guided fashion in relation to the first optical element by way of sliding along the at least one sliding guide surface. Preferably, the optical elements are arranged in succession along an optical axis and are moved parallel to one another parallel to a plane running perpendicular to the optical axis.

Within the scope of the method according to the disclosure for producing a guide component according to the disclosure, at least a first sliding guide surface and a second sliding guide surface are ablated from a component, preferably a one-piece component, for example by turning, milling, grinding, eroding, et cetera. The at least two sliding guide surfaces and optional further guide surfaces are advantageously ablated in one work step, that is, for example while maintaining the chucking. As a result, particularly high precision and hence a correspondingly high guide accuracy can be obtained. In principle, at least one further guide surface, for example a sliding or rolling-element guide surface, can be ablated from the guide component in addition to the at least two sliding guide surfaces within the scope of producing a guide component according to the disclosure.

Preferably, the sliding guide surfaces and optional further guide surfaces of the guide component are processed in such a way by common manufacturing that instances of overdetermination are avoided or reduced to a minimum. Advantageously, all sliding guide surfaces have an extensive configuration in order to be able to absorb jolts well. This facilitates the use of sensitive optics and a sensitive mechanism even in rough surroundings, for example in conjunction with consumer products where insensitivity to jolts, vibrations, high humidity and significant temperature variations is sought after.

Within the scope of the method according to the disclosure for producing an optical element according to the disclosure, a sliding guide surface is ablated from an optically effective structural element of the optical element or from a mount of the optical element, for example by turning, milling, grinding, eroding, et cetera. In this case, the optical element may include a free-form surface and the sliding guide surface may be ablated in defined fashion in relation to the free-form surface. As a result, a subsequent adjustment of the optical element in view of the geometry of the free-form surface in relation to the mount or the fixation of the optical element becomes superfluous. Additionally, at least one further guide surface, for example a sliding or rolling-element guide surface, can be ablated from an optically effective structural element of the optical element or from a mount of the optical element within the scope of the method according to the disclosure for producing an optical element according to the disclosure.

In an advantageous variant, the optical element includes a mount and at least one slide element is fastened to the mount, for example a slide pad which is preferably provided with a machining allowance. Within the scope of the production, the slide element is ablated in defined fashion in relation to the optically effective structural element, in particular a free-form surface. As a result, a unique determination of the relative position of the slide element in relation to a sliding guide surface of a guide component is ensured.

Overall, the present disclosure is advantageous in that it facilitates a joint guidance or common movement of optical elements that are related to one another. By way of example, the position of optical free-form elements that are assigned to one another can be set separately and independently from a common linear movement. Adjustment positions are economized by the present disclosure and so the required installation space is reduced. Hence, very compact optical systems can be realized. A further advantage includes the substantial long-term stability since settling appearances, in particular, are reduced. Simultaneously, great functional reliability, that is, a high product quality, is obtained. Moreover, adjustment times are reduced since only the positions of the optical elements that are related to one another need to be set, in particular the free-form elements that are related to one another need to be set in view of their movement direction. Furthermore, the number of mechanical component parts is reduced. The described elements and component parts have, both on an individual basis and in combination with one another, great stability and rigidity, and hence great robustness. As a result, the optical assembly according to the disclosure, the wavefront manipulator and the optical device likewise have a simple and robust structure and comparatively low production costs, and require little installation space.

By way of example, an accurate guide of two or more free-form elements is facilitated by the use of sliding guide surfaces situated on a common guide component. As a result of the separate and separated sliding guide surfaces for guiding the optical elements, in particular the free-form elements, being situated on a common component part, specifically the guide component, a joint manufacture of the sliding guide surfaces is rendered possible. This facilitates guide accuracies within the mechanical manufacturing tolerances, for example below 10 micrometers (10 μm). The surfaces for guiding the individual optical elements are preferably attached directly to a mount of the respective optical element, for example to the mount of a free-form optical unit. The latter can be manufactured, in particular directed, very accurately in relation to the optical characteristic of the respective optical element, for example in relation to the respective free form, over the movement range, for example ±5 mm. In this way, it is possible to dispense with additional filler elements or auxiliary parts, promoting a particularly compact and simple structure.

Via the present disclosure, it is possible to realize a guide accuracy ranging from 4 to 10 micrometers (4 μm-10 μm) and a resistance to shock loads of more than the gravitational acceleration and of more than three times the gravitational acceleration during the operation of the respective component, in particular the optical assembly according to the disclosure. The employed slide guide is predominantly maintenance free. Moreover, a small installation size is facilitated by the slide guide.

The present disclosure is particularly suitable for use in cine and camera lenses, in particular for the purposes of influencing properties of the lens, for example the focusing and/or the generation of effects for soft focusing or generating a defined blur (bokeh). Preferably, the present disclosure is suitable and configured for travels of less than ±10 mm, preferably of the order of ±3 mm. Furthermore, there is a possible application in conjunction with cameras and displays or other optical devices in the automotive field, that is, in conjunction with vehicles and aircraft.

BRIEF DESCRIPTION OF THE DRAWINGS

The invention will now be described with reference to the drawings wherein.

DESCRIPTION OF THE PREFERRED EMBODIMENTS

Figure 1:
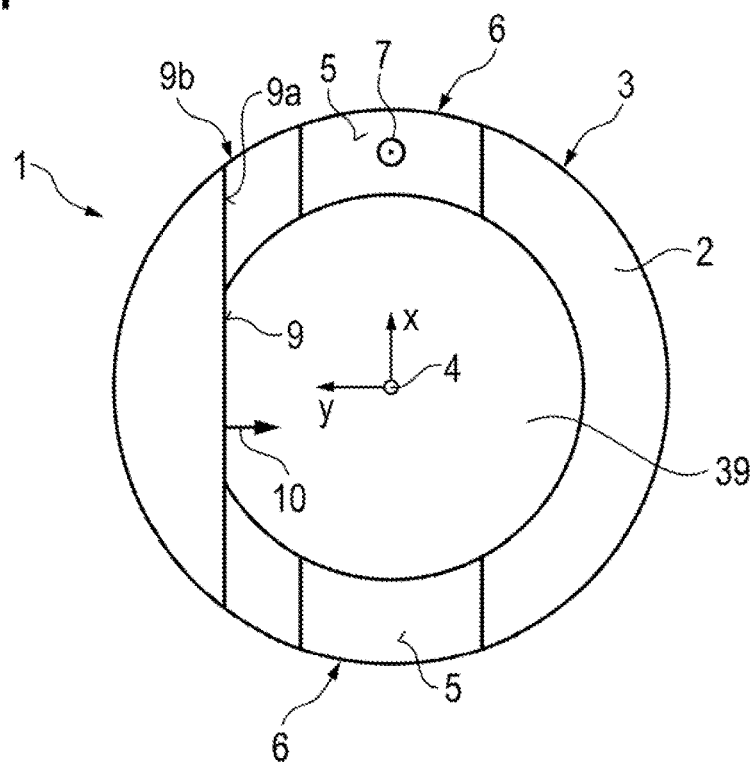
FIG. 1 schematically shows a guide component according to the disclosure in a plan view.

FIG. 1 schematically shows a guide component 1 according to the disclosure in a plan view. The shown guide component 1 is configured for joint guidance of at least two optical elements that are movable in relation to one another. To this end, the shown guide component 1 has a front side 2 and a back side 3. Moreover, the guide component 1 has a central axis 4 which extends in the z-direction. The optical axis likewise extends in the z-direction. The shown guide component 1 has a passage opening 39 in the region of the central axis 4. It has a ring-shaped embodiment. Other embodiments are likewise possible.

The guide component 1 includes two spatially separated planar sliding guide surfaces, a first sliding guide surface 5 being arranged on the front side 2 and a second sliding guide surface 6 being arranged on the back side 3 of the guide component 1. In the variant shown, the sliding guide surfaces each have an upper and a lower sliding guide surface region in the x-direction.

The two sliding guide surfaces 5 and 6 are preferably embodied to be symmetrical with respect to one another in view of an xy-plane. The first sliding guide surface 5 arranged on the front side 2 has a first surface normal 7, which runs in the z-direction in the variant shown and projects out of the image plane. The second sliding guide surface 6 which is arranged on the back side 3 of the guide component 1 has a second surface normal 8 (not visible in FIG. 1 but shown in FIG. 3), which runs parallel to the z-axis but is directed into the plane of the drawing. Expressed differently, the first sliding guide surface 5 and the second sliding guide surface 6 are embodied facing away from one another. They are constituent parts of a structural element embodied in one piece, which has both sliding guide surfaces. In the variant shown, the first and the second sliding guide surface each form a stop in relation to a displacement in the z-direction for a first and a second optical element to be guided.

Furthermore, the guide component 1 shown in FIG. 1 has a further sliding guide surface 9 with a surface normal 10. The surface normal 10 runs parallel to the y-direction. The further sliding guide surface 9 forms a stop against a displacement in the y-direction for at least one optical element to be guided, preferably for both optical elements to be guided. Preferably, the sliding guide surface 9 has a first surface region 9a which forms a stop for the first optical element and a second surface region 9b which forms a stop for the second optical element. In this case, the first and the second surface region are arranged in succession in a z-direction that runs perpendicular to the xy-plane. Thus, two optical elements can firstly be displaced jointly by displacement of the guide element and moreover can be displaced in relation to one another in the x-direction via the guide element 1 shown in FIG. 1. In the case of such a displacement, respective surfaces of the optical element to be guided slide along the respective sliding guide surfaces 5, 6 and 9.

Within the scope of a production method according to the disclosure for a guide component 1 according to the disclosure, the sliding guide surfaces 5, 6, and optionally also the at least one further sliding guide surface 9, are ablated from material with machining allowance, preferably from a component embodied in one piece. The ablation can be implemented by turning, milling, grinding, eroding or any other method. The sliding guide surfaces can additionally be coated with a slide-promoting plastic.

Figure 2:
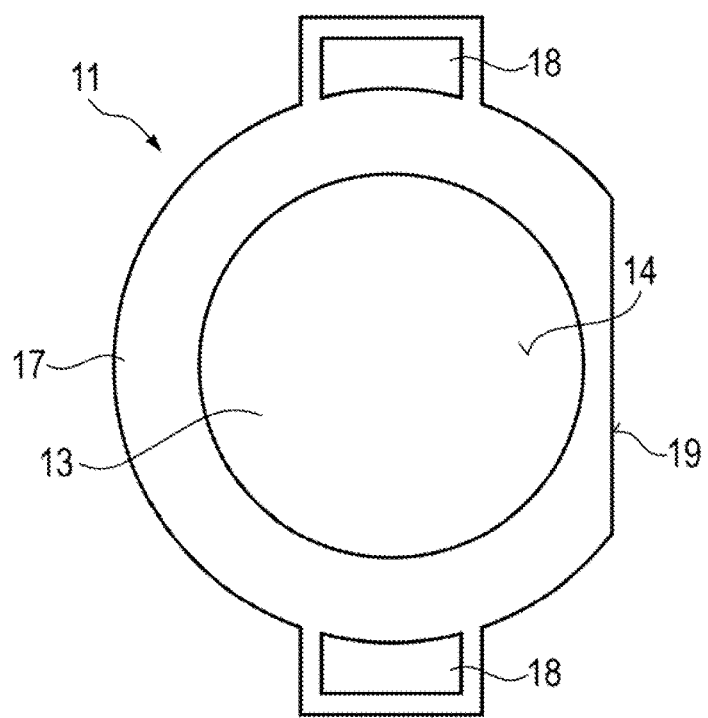
FIG. 2 schematically shows an optical element according to the disclosure in a plan view.

FIG. 2 schematically shows an example of an optical element 11 according to the disclosure in a plan view. In the variant shown, the optical element 11 has an optically effective structural element 13, for example an Alvarez element, which includes a plane surface 15—not visible in FIG. 2—and a free-form surface 14. Moreover, the optical element 11 has a mount 17. The mount 17 includes two sliding guide surfaces 18 which are configured to be placed against the sliding guide surfaces 5 of the guide element 1 shown in FIG. 1 in order thereby to facilitate a displacement in the x-direction, guided by sliding, of the optical element 11 in relation to the guide element 1. Moreover, the mount 17 includes a further sliding guide surface 19 which is configured to be placed against the sliding guide surface 9 of the guide element 1 shown in FIG. 1 in order thereby likewise to facilitate a displacement in the x-direction, guided by sliding, of the optical element 11 in relation to the guide element 1. In this case, the sliding guide surfaces 5 and 18 act as a stop against a displacement of the optical element 11 in the z-direction and the sliding guide surfaces 9a and 19 act as a stop against a displacement of the optical element 11 in the y-direction.

Within the scope of a production method according to the disclosure for an optical element 11 according to the disclosure, the sliding guide surfaces 18, and optionally also the further sliding guide surface 19, are ablated from sliding material with machining allowance that has been attached to the mount 17, for example a sliding pad. The ablation can be implemented by turning, milling, grinding, eroding or any other method. Preferably, the ablation is implemented in defined fashion in relation to the optical features of the respective optical element 11, for example in defined fashion in relation to the geometry of the free-form surface 14. The sliding guide surfaces 18, 19 can additionally be coated with a slide-promoting plastic.

Figure 3:
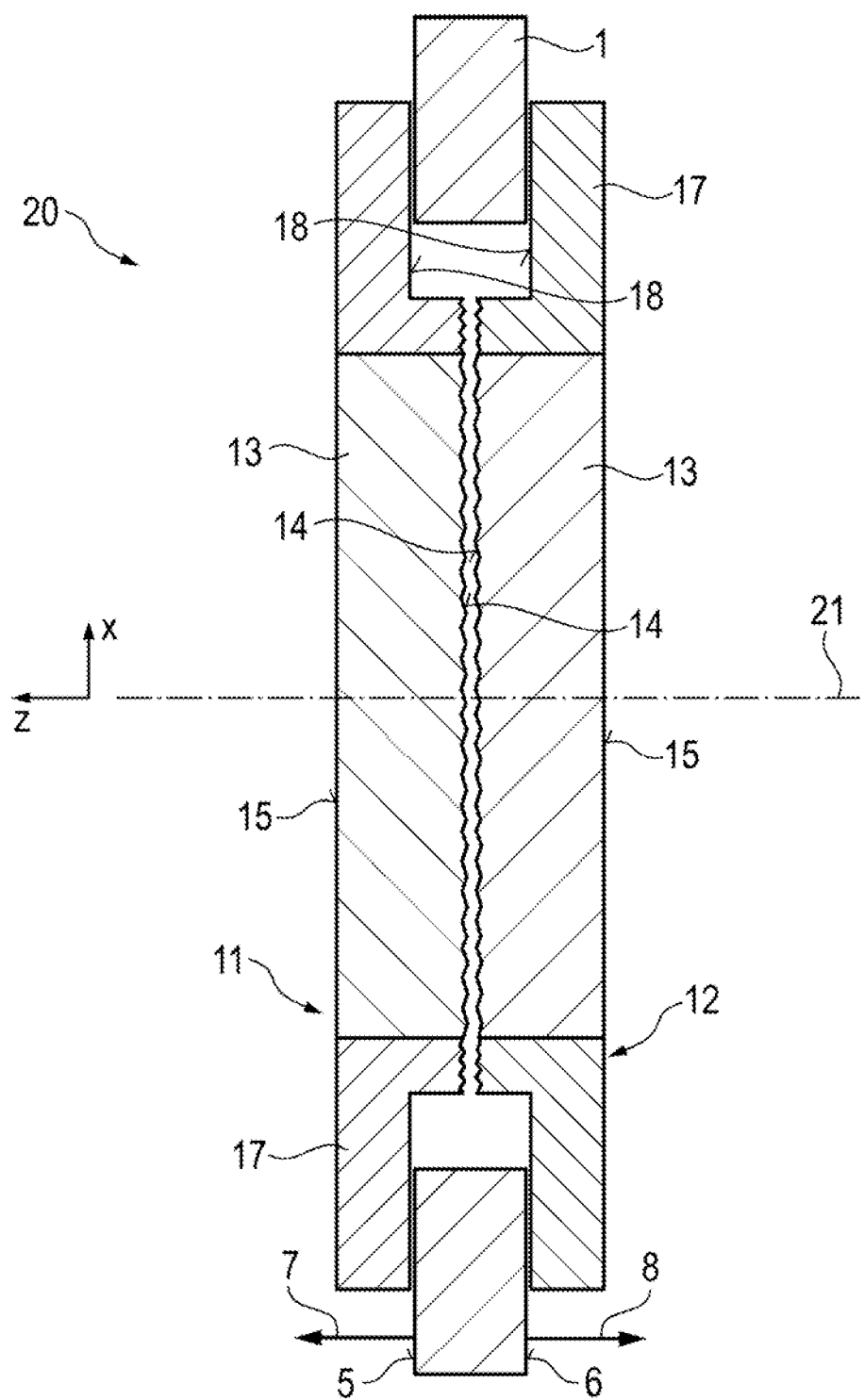
FIG. 3 schematically shows a wavefront manipulator according to the disclosure in a view cut perpendicular to the optical axis or perpendicular to the y-axis.

Preferably, a first optical element 11, for example as shown in FIG. 2, is arranged on the front side 2 of the guide element 1 shown in FIG. 1 and a second optical element 12 with an analogous embodiment in view of the available guide surfaces is arranged on the back side 3 of the guide element 1 shown in FIG. 1. FIG. 3 schematically shows such an optical assembly 20 according to the disclosure in the form of a wavefront manipulator which includes a guide element 1 as shown in FIG. 1, a first optical element 11 as shown in FIG. 2 and a second optical element 12 with an analogous structure to the first optical element. In this case, FIG. 3 schematically shows the wavefront manipulator 20 in a view cut perpendicular to the optical axis or perpendicular to the y-axis. The first optical element 11 and the second optical element 12 are arranged in succession in the direction of the optical axis 21 or in the z-direction. By way of example, the optical elements 11 and 12 shown are two free-form elements that are adapted to one another and each have a plane surface 15 and a free-form surface 14. In the present embodiment, the optical elements 11 and 12 are arranged such that their free-form surfaces 14 face one another. However, they can also be arranged on the sides facing away from one another, or free-form surfaces 14 can be arranged on both sides of an optical element 11, 12. The optical elements 11 and 12 with the free-form surfaces 14 are arranged in succession along an optical axis 21 and are mounted to be displaceable parallel to a straight line, the x-direction in the present case, extending perpendicular to the optical axis 21.

As an alternative to free-form elements, a combination of two optical elements that are adapted to one another could be a combination of two of the aforementioned optical elements, for example.

The optical elements 11, 12 serve as a wavefront manipulator, in which the degree of manipulation effect on the wavefront depends on the degree of displacement of the optical elements 11, 12 along the straight line in the x-direction. Typically, the displacement of the optical elements 11, 12 to bring about the wavefront manipulation takes place along the straight line by the same amount, but in opposite directions. For the purposes of fine correction, however, it can be advantageous if each optical element 11, 12 can be displaced by individual amounts. By manipulating the wavefront, for example, aberrations of the optical system in which the optical assembly 20 is installed can be compensated. The correction to the strength of the aberration that occurs can be adjusted by the amounts of the displacement of the two optical elements 11, 12. If the optical elements 11, 12 can be displaced by individual amounts, it is also possible to perform an optical fine correction. The compensation of aberrations by the displacement of the optical elements of a wavefront manipulator is described in DE 10 2013 101 711 A1. Reference is therefore made to that document with respect to compensating for aberrations.

As an alternative to compensating for aberrations, it is possible to introduce an aberration into the optical system in which the optical assembly 20 is installed by displacing the optical elements 11, 12 in opposite directions, for example in order to bring about a spherical aberration in a soft focus lens, which leads to a soft focus effect. How such a soft focus effect can be brought about is described in DE 10 2014 118 383 A1. Reference is therefore made to that document with respect to bringing about a soft focus effect.

Figure 4:
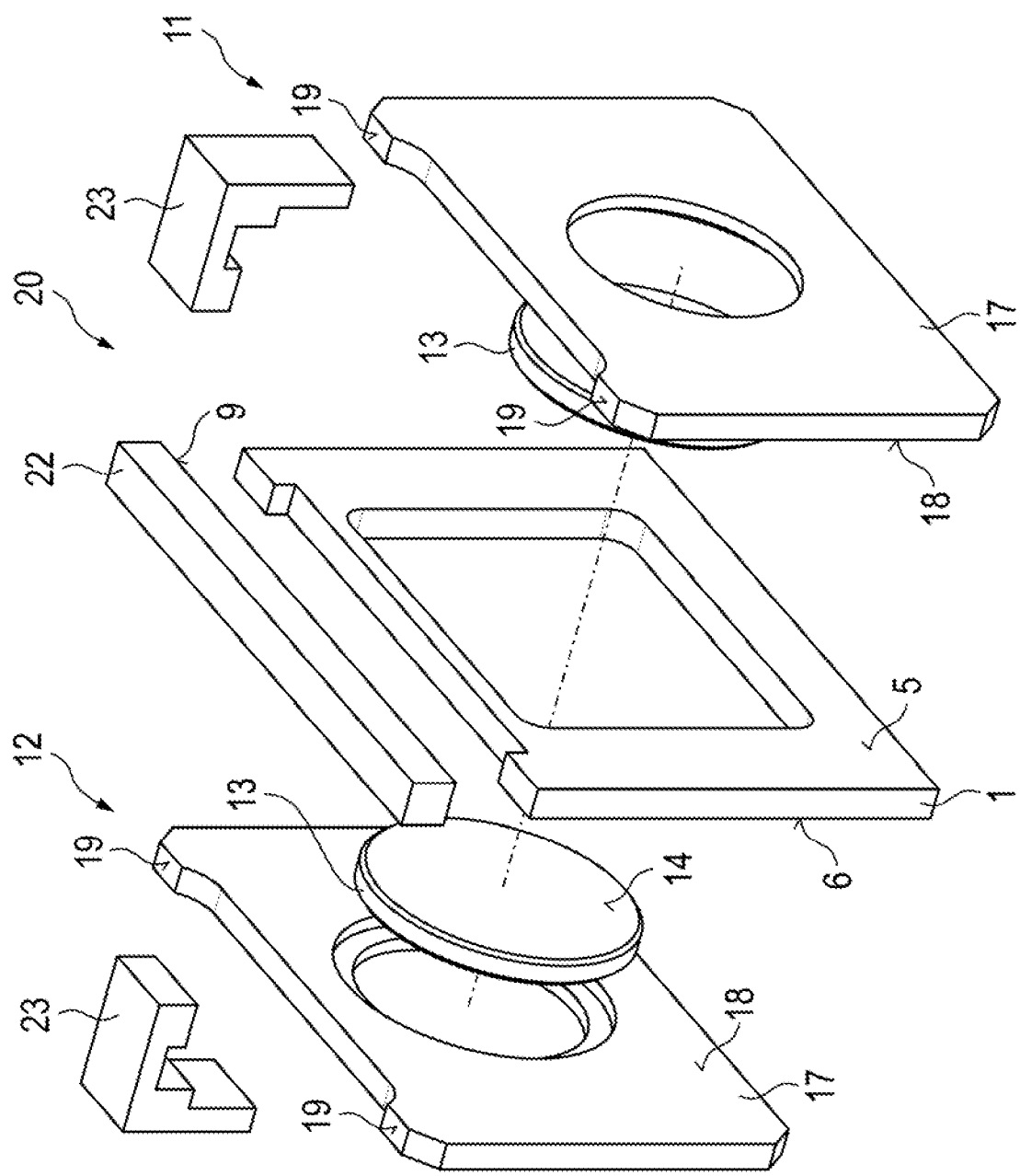
FIG. 4 schematically shows an exploded view of a first variant of an optical assembly according to the disclosure.
Figure 5:
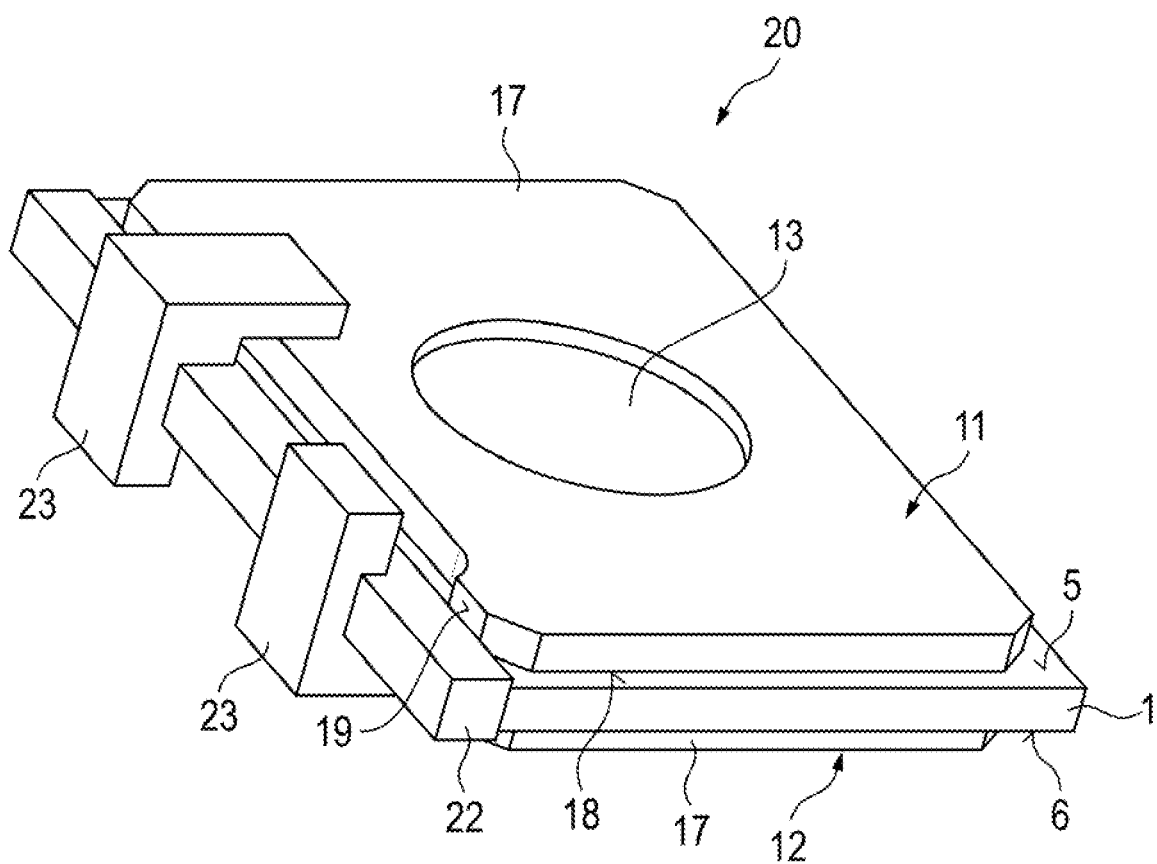
FIG. 5 schematically shows a perspective view of the variant shown in FIG. 4.

A first detailed embodiment variant is explained in more detail below on the basis of FIGS. 4 and 5. FIG. 4 schematically shows an exploded view and FIG. 5 shows a perspective view of an optical assembly 20 according to the disclosure. In this embodiment variant, and in the following embodiment variants, two optical elements 11 and 12 are arranged on a common guide component 1 in such a way that they can be adjusted or moved in guided fashion in relation to one another in at least one direction via the spatially separated but jointly produced sliding guide surfaces 5, 6 of the guide component 1. In this case, the optical elements 11, 12 can be displaced in relation to one another by translation or turned in relation to one another by rotation. In the variant shown, there is a translation in the x-direction. A rotation, for example about an axis in the z-direction or about an optical axis 21 would require, deviating from the embodiment variants shown, at least partly curved sliding guide surfaces with radii of curvature extending in the xy-plane, for example. However, such a configuration is likewise possible.

In all embodiment variants, at least one sliding guide surface and optionally further sliding or rolling-element guides are provided for each optical element 11, 12 to be guided. Individual details of the variants described below can be combined with one another and can be connected to one another in various ways.

In the variant shown in FIG. 4, provision is made of an axial stop in the z-direction by the first sliding guide surface 5 and the second sliding guide surface 6, and of a further sliding guide surface 9 realized by a bar 22, which forms a stop in the y-direction. Moreover, two drives 23, piezo-walk drives in the present example, are provided, in each case as a separate drive for a displacement of the individual optical elements 11, 12. In the variant shown in FIG. 4, the guide component 1 is realized as a main mount, in which a ceramic bar 22 is arranged. The ceramic bar 22 is preferably ground and adhesively bonded into the main mount 1.

A respective first optical free-form element 13 and a corresponding second optical free-form element 13 are in each case connected to a mount 17. Preferably, sliding elements in the form of sliding pads, which are preferably provided with a machining allowance, are fastened to the respective mounts 17. Within the scope of the production of the respective optical element 11, 12, the sliding pads can be ablated in a defined fashion in relation to a free-form surface 14 of the optically effective structural element 13. This ensures a unique determination of the relative position of the sliding guide surface 18 of the respective optical element 11, 12 in relation to the sliding guide surface 5, 6 of the guide component 1, that is, of the sliding contact. The sliding pads of the mounted free-form optical unit are made to rest against the sliding guide surfaces 5, 6 and can be pressed against the latter by a spring plate and/or by a pressure spring of the piezo drive 23.

To move the optical elements 11, 12, presently the two free-form optical elements, a piezo-walk drive 23, which likewise moves along the ceramic bar 22, is used in this variant. A pressure spring can in this case ensure the required force fit between the piezo-walk drive 23 and the ceramic bar 22. By way of example, an absolute measurement system can be used to detect the actuating position in the x-direction. In this case, a sensor can be securely connected to the guide component 1. A linear scale may be fastened to the mount 17. The mounted optical free-form elements 11, 12 are arranged in pairs and access different sliding guide surfaces 5, 6 on the common guide component 1. A dedicated piezo-walk drive 23 and an absolute measurement system is preferably assigned to each optical free-form element 11, 12.

When actuating the piezo-walk drives 23, these move along the ceramic bar 22 in different directions in relation to one another and take the mounted free-form elements 11, 12 along in the process. In this way, it is possible to realize a guidance accuracy of below 10 micrometers ($\Delta y = \Delta z < 10$ µm) over the entire movement range of up to $\Delta x = \pm 5$ mm. The piezo-walk drives 23 facilitate positioning rates of up to 15 mm/s.

Figure 6:
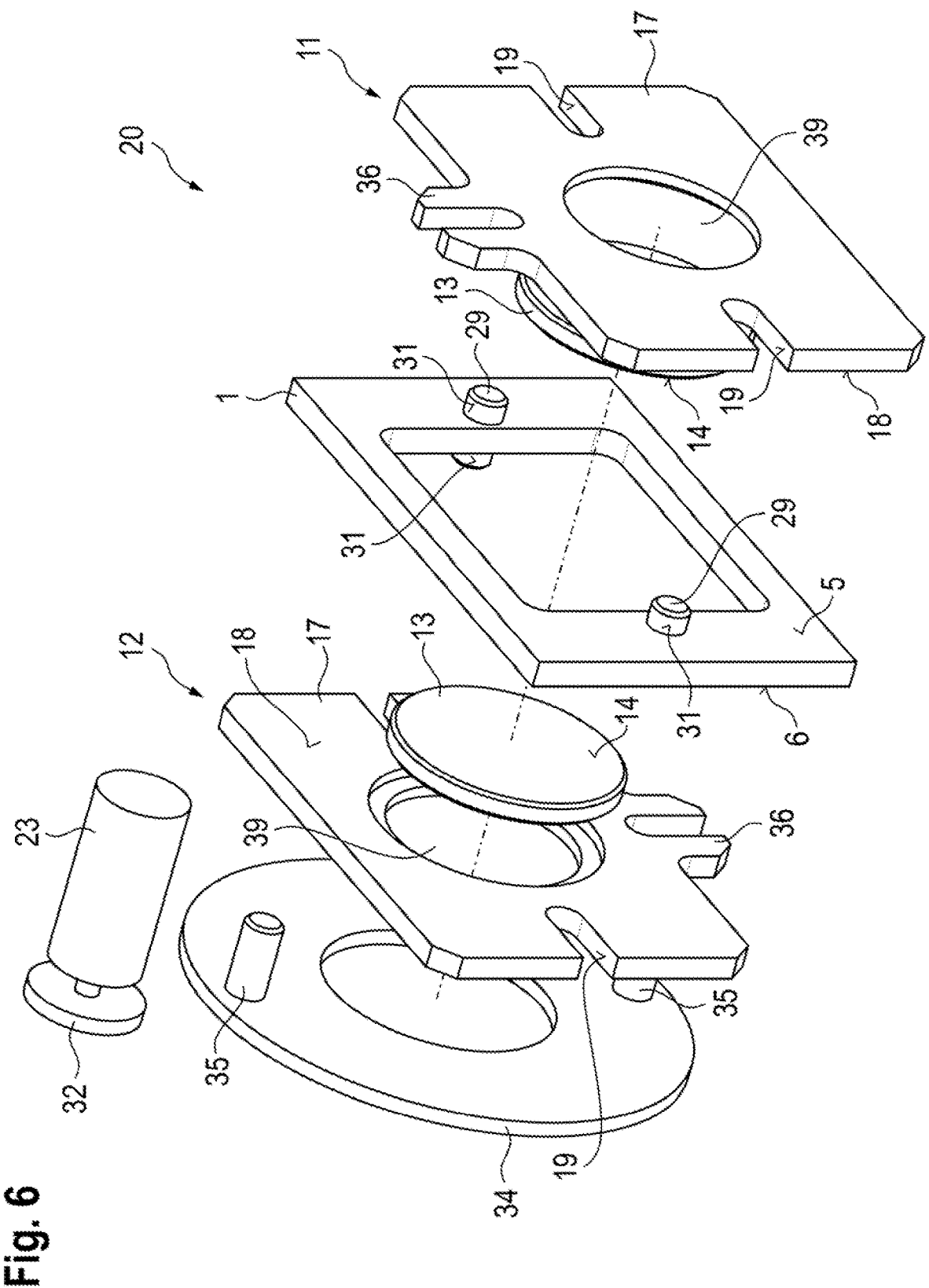
FIG. 6 schematically shows an exploded view of a second variant of an optical assembly according to the disclosure.
Figure 7:
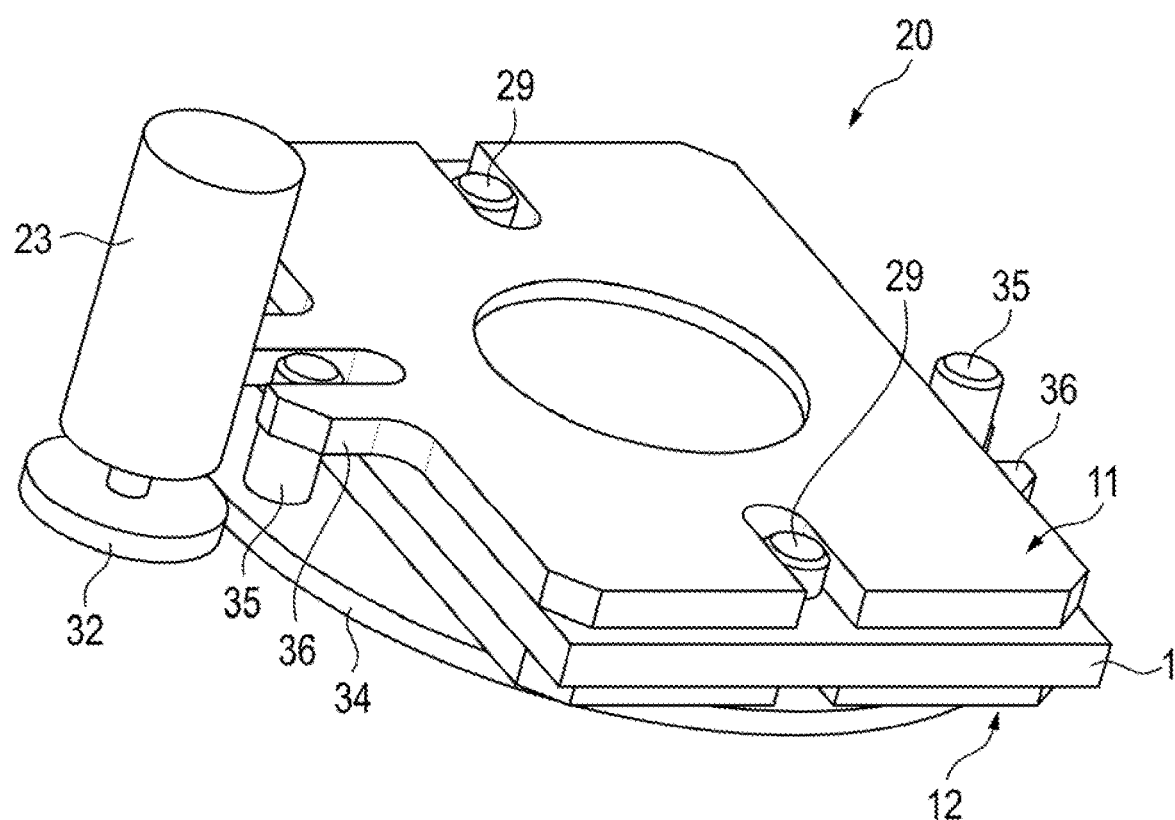
FIG. 7 schematically shows a perspective view of the variant shown in FIG. 6.

In the variants shown in FIGS. 6 and 7, two pins 29 are provided instead of the bar 22 for guidance and as rests in the y-direction for the purposes of forming further guide surfaces. Moreover, a rotational piezo-ultrasonic motor 23 and a gearing are provided. To guide the optical free-form elements 11, 12, use is made firstly of the planar sliding guide surfaces 5, 6 on the guide component 1, which were already shown in FIGS. 4 and 5, and additional use is made of cylindrical surfaces 31 which are arranged on the two pins 29. In this case, the rest surfaces 5 and 6 of the guide component 1 form the sliding guide surface in the z-direction. The surfaces 31 on the pins 29 form the required rest in the y-direction. The free-form optical unit 13 is once again located within a mount 17 which may include sliding pads. The sliding guide surfaces 18, 19, preferably both the contact surfaces 18 in the z-direction and the contact surfaces 19 in the y-direction, are initially embodied as sliding elements with a machining allowance. This is ablated in directed fashion with respect to the free-form surface 14 in order to influence the distance and alignment of the optical free-form elements 11, 12 in targeted fashion. By way of example, spring plates are used to keep the mounted free-form optical units axially in position.

Only one motor 23, specifically a rotational piezo-ultrasonic motor, can be used as a drive in this variant. A piezo-ceramic 32 is pressed onto a friction ring 34 which is rotatably mounted in the guide component 1 by way of for example rolling-element bearings arranged at an interval of 120°. Two rolling-element bearings 35 which serve to transform the rotational movement of the piezo-ultrasonic motor into linear opposing movements of the two optical free-form elements 11, 12 may be fastened to the friction ring 34. In this case, the actuating position or start position can be finely tuned. By way of example, this is possible by way of adjustable drivers 36. To remove the allowance from the gearing arrangement, use can be made for example of a spring which braces the two mounted free-form elements 11, 12 against one another. The actuating position is detected by a measurement system, preferably an absolute measurement-type measurement system. In this case, a sensor head can be fastened to the guide component 1. This has the advantage of not needing to move along optionally required cables. A linear scale may be fastened to one of the two mounts 17.

The piezo-ultrasonic motor 23 puts the movably mounted friction ring 34 into rotational movement. In this case, the rolling-element bearings 35 fastened to the friction ring 34 change their relative position. The mounted free-form elements 11, 12 are connected to the rolling-element bearing 35 by way of the drivers 36 fastened thereto and are linearly deflected in the x-direction, with this being a rolling friction pairing. In this variant, travels of ±5 mm and more can be facilitated, with the guidance accuracy being of the order of 10 micrometers (10 μm). Very high positioning rates which facilitate very short reaction times are obtained by the piezo-ultrasonic motor. Deviating from the above-described embodiment variant, a separate drive may also be provided for each free-form element 11, 12. As a result, an individual adjustment or position error correction can be facilitated for the free-form elements 11, 12. Furthermore, this variant can dispense with a transfer gearbox, which is otherwise required, and hence can dispense with the adjustment of same during the assembly.

Alternatively, use can be made of a motor with a rack-and-pinion gear and/or a lever-type gear. In principle, a separate drive 23, in particular a separate motor and a separate gearing, can be provided for each optical element 11, 12. However, both optical elements 11, 12 may also be moved in relation to one another via merely a common drive 23. By way of example, one or two piezo-ultrasonic motors may be provided as drive 23. In principle, the stop in the y-direction may also be realized by a rolling-element bearing.

Figure 8:
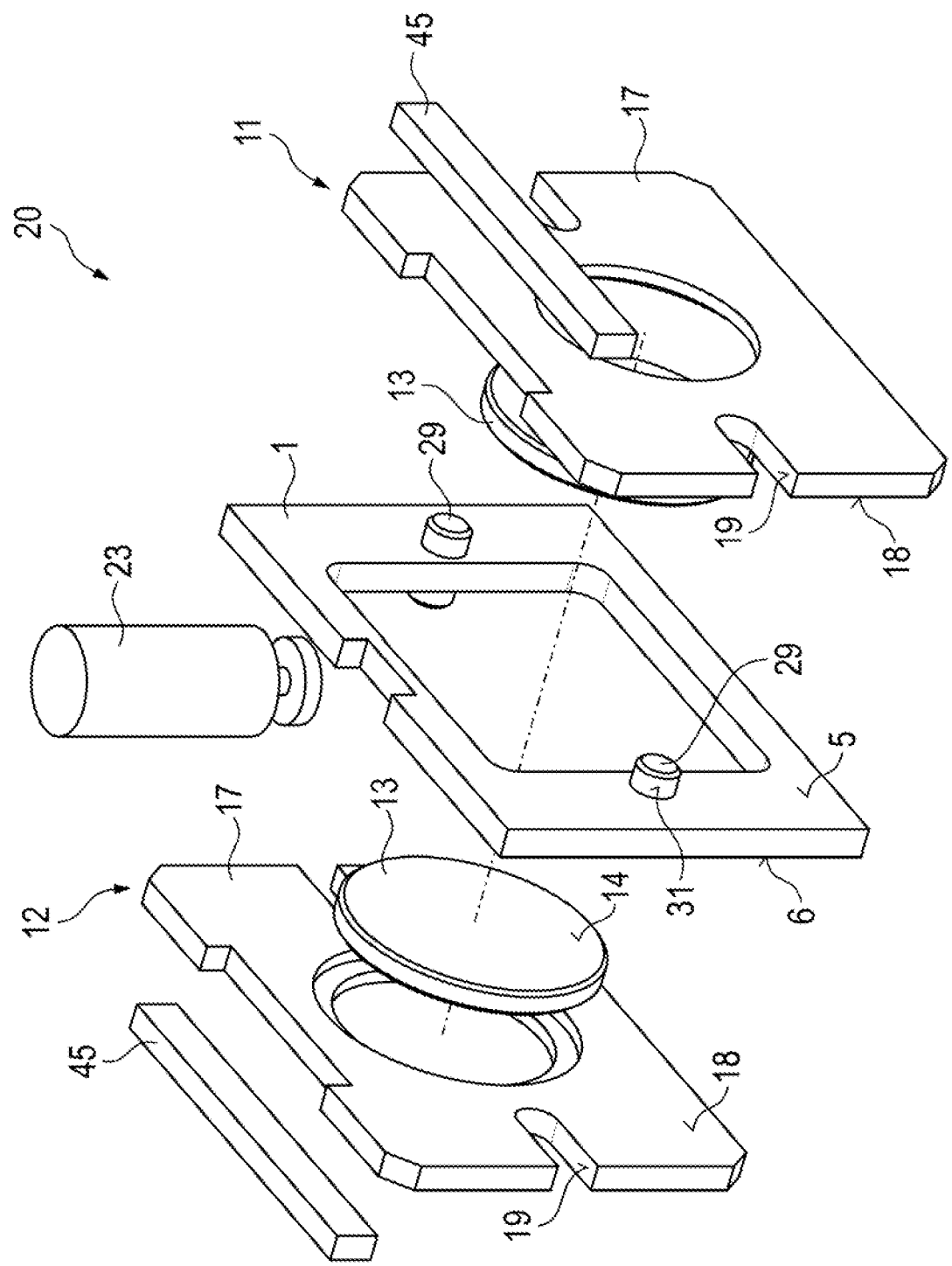
FIG. 8 schematically shows an exploded view of a third embodiment variant of an optical assembly according to the disclosure.
Figure 9:
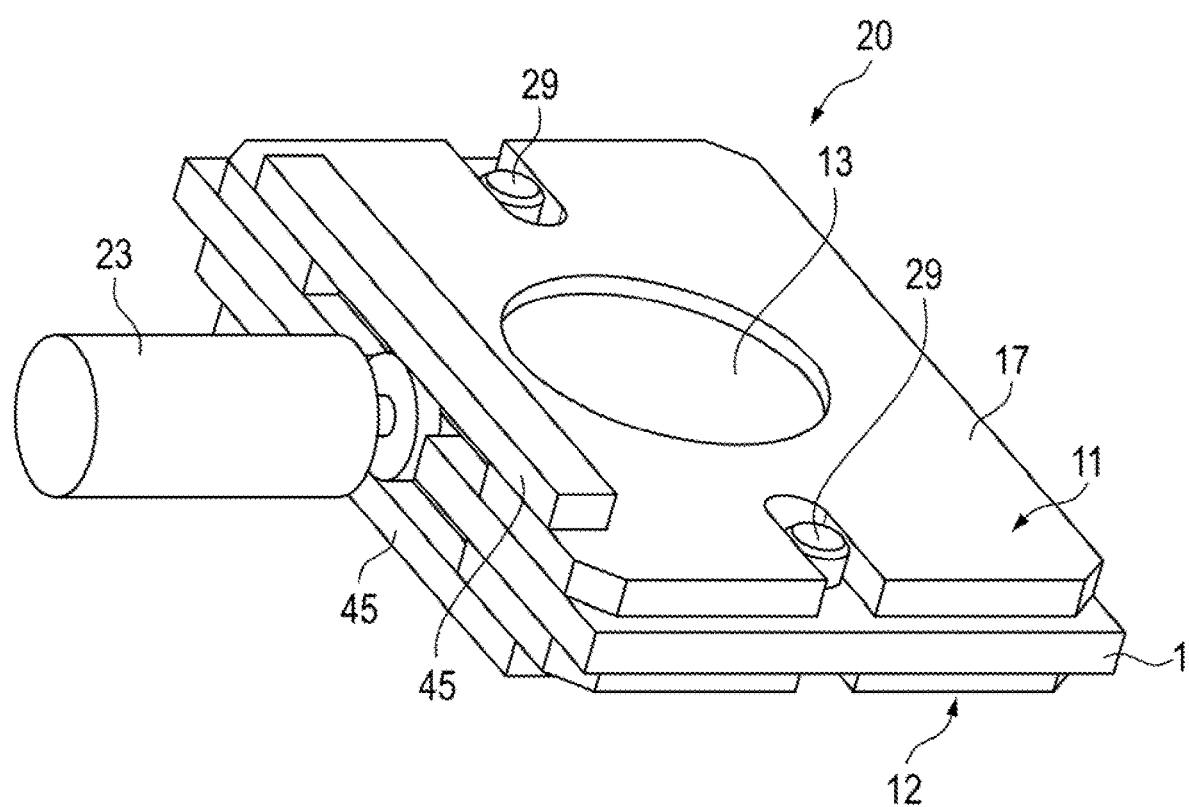
FIG. 9 schematically shows a perspective view of the variant shown in FIG. 8.

FIGS. 8 and 9 schematically show a further embodiment variant which, deviating from the above-described variant, is embodied with only a motor and a rack-and-pinion gear. A geared motor, for example a DC motor or a stepper motor, is used as drive 23. The optical elements 11 and 12 are moved directly by way of racks 45 arranged thereon.

Figure 10:
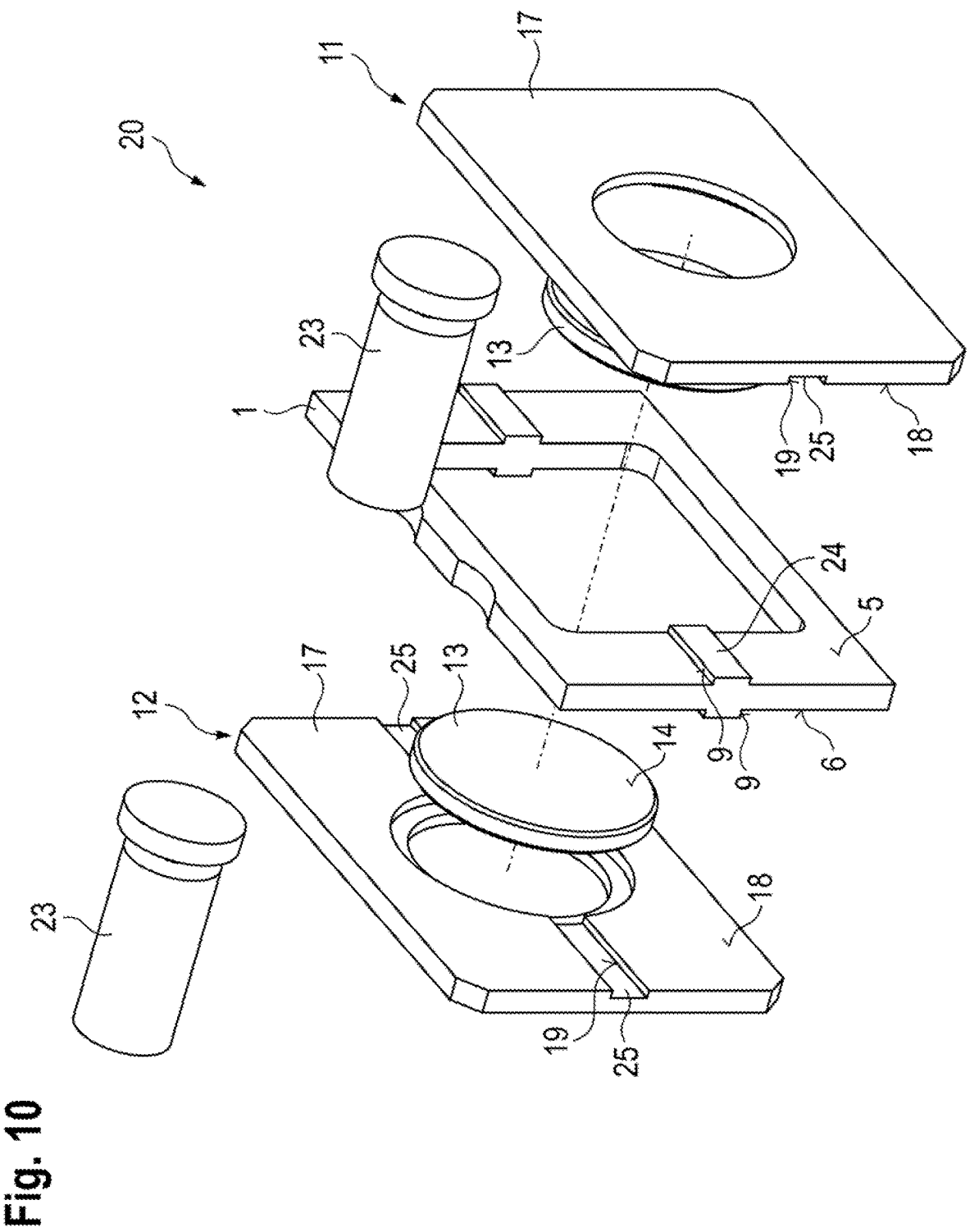
FIG. 10 schematically shows an exploded view of a fourth embodiment variant of an optical assembly according to the disclosure.
Figure 11:
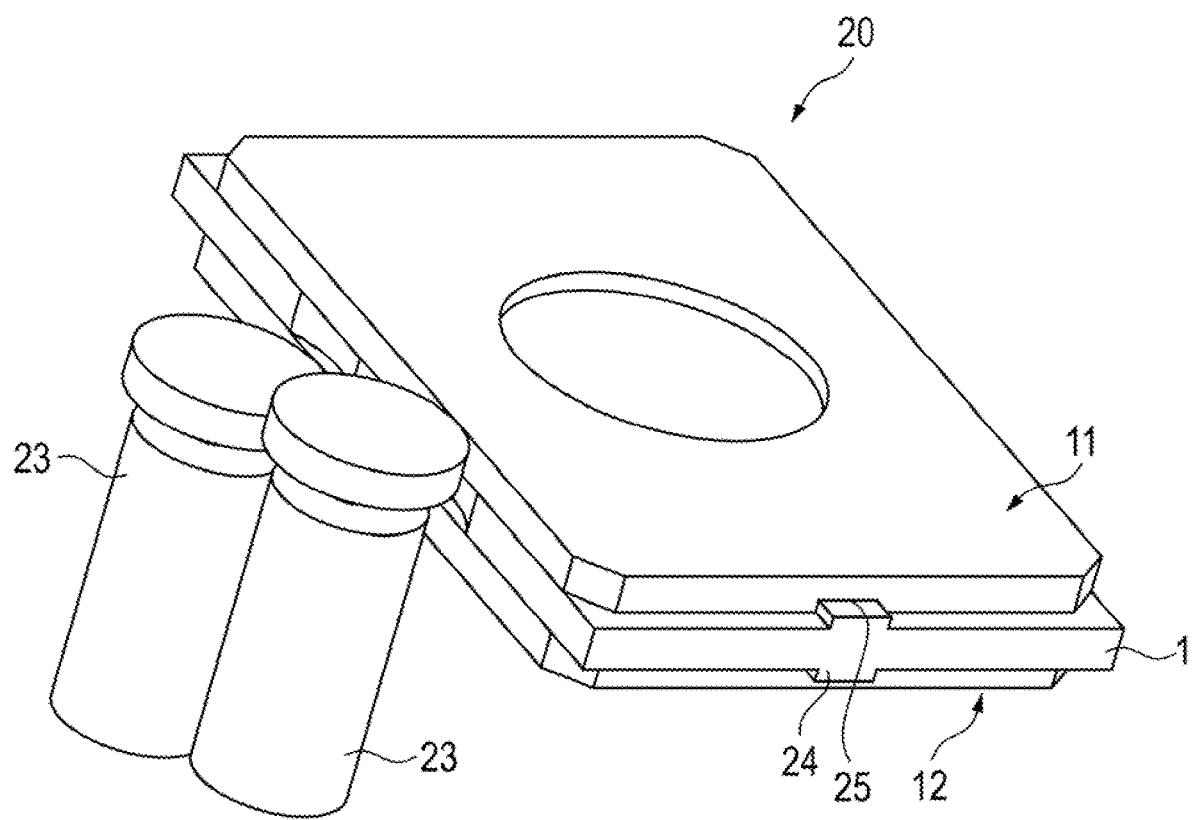
FIG. 11 schematically shows a perspective view of the variant shown in FIG. 10.

FIGS. 10 and 11 show a variant with two motors 23. In this variant, elevations 24 with further sliding guide surfaces 9 are present on the two planar sliding guide surfaces 5 and 6 of the guide component 1. Depressions 25 which correspond to the elevations 24 and which include surfaces 19 for guiding the optical elements 11 and 12 are provided in the mounts 17 of the optical elements 11 and 12. Alternatively or in addition, further sliding guide surfaces 9 may be present as partial surfaces of depressions in the two planar sliding guide surfaces 5 and 6 of the guide component 1 and elevations, corresponding to the depressions, in the mounts 17 of the optical elements 11 and 12, which have surfaces 19 for guiding the optical elements 11 and 12.

Figure 12:
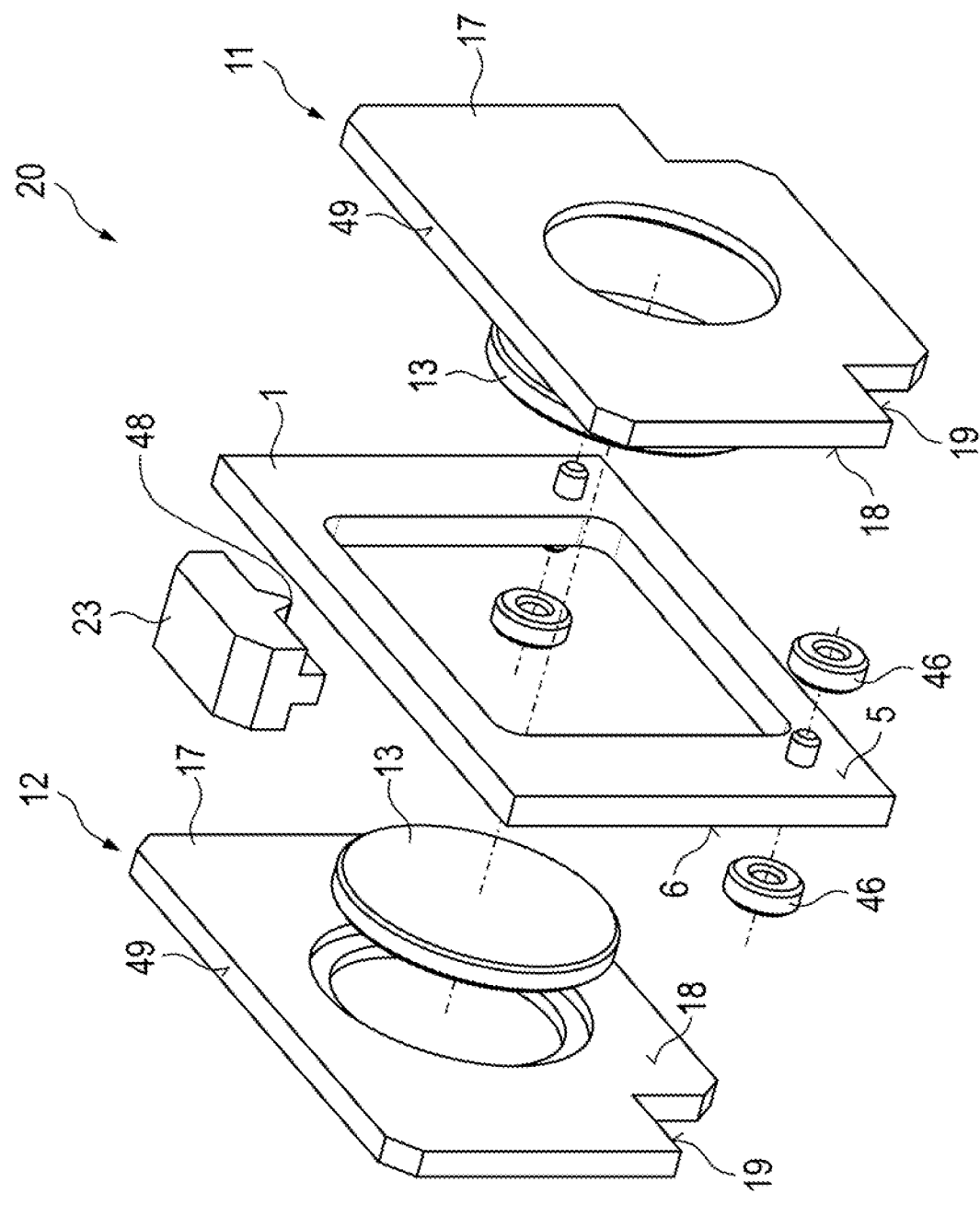
FIG. 12 schematically shows an exploded view of a fifth embodiment variant of an optical assembly according to the disclosure.
Figure 13:
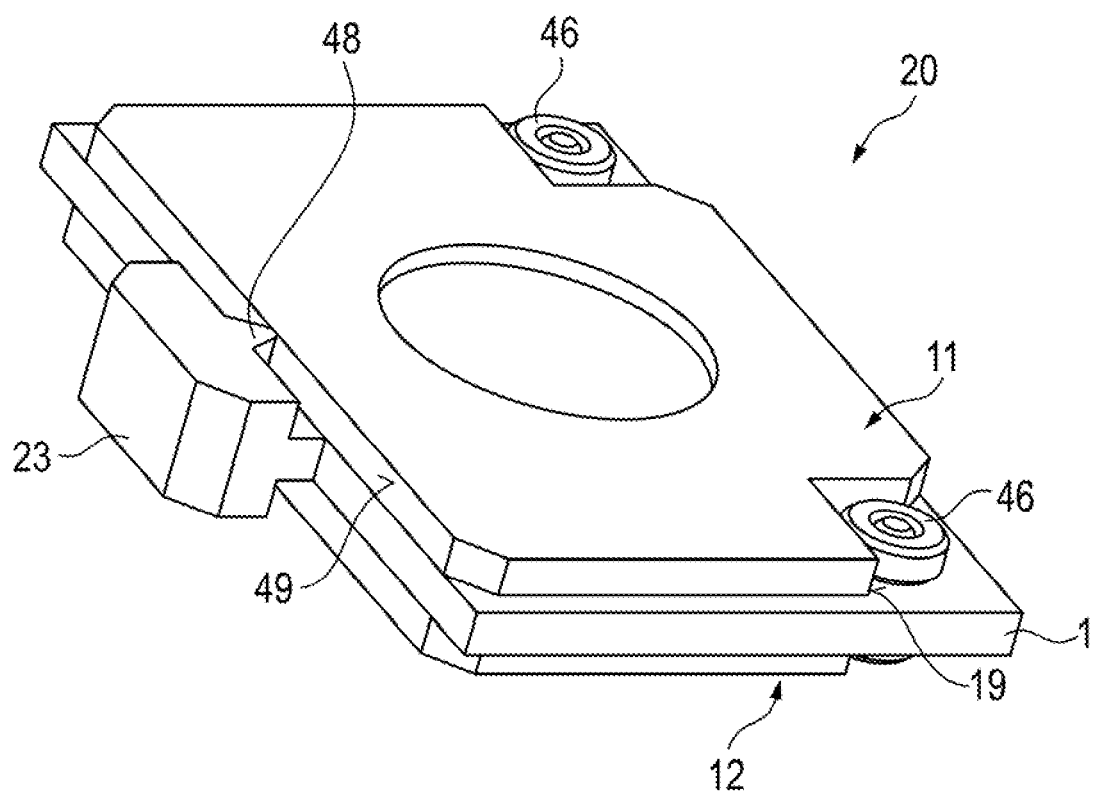
FIG. 13 schematically shows a perspective view of the variant shown in FIG. 12; and, FIG. 14 schematically shows an optical device according to the disclosure.

FIGS. 12 and 13 schematically show an embodiment variant with a rolling-element guide in the y-direction. In this case, rolling-element bearings 46 that are fastened to a pin serve as guide rests in the y-direction. The corresponding surfaces 19, on which the rolling-element bearings 46 roll, are worked onto the moving counter piece of the mount 17, in a manner directed to the free-form optical unit. Likewise, surfaces that mechanically delimit the maximum displacement may be situated on the mount 17.

In the variant shown, the rolling-element guide is brought about by a linear piezo-ultrasonic drive, for example, since the latter requires a low coefficient of friction in the guidance for an error-free function. This can be realized with rolling friction, as occurs predominantly in a rolling-element bearing. The piezo-ultrasonic motor 23 facilitates a very quick adjustment movement that is not audible by the human ear.

A dedicated drive can be provided for each optical element 11, 12, and so the free-form elements can be displaced independently of one another in the x-direction. This facilitates a correction of the actuating position over the entire travel, in particular in order to influence optical properties in a targeted manner. A mount of the piezo-ultrasonic motors 23 which is not explicitly shown may have a resilient embodiment and ensure that a friction lug 48 of the piezo-ultrasonic motor 23 is pressed against a friction rail 49 which is formed on the mount 17 or fastened to the latter and which forms a guide rail in the y-direction. As a result, the worked-on running surfaces 19 of the mount 17 are pressed against the rolling-element bearing 46 and a play-free drive is obtained. To keep wear low, the friction rail 49 and the friction lug 48 may be produced from a wear-resistant material, for example a ceramic.

When the piezo-ultrasonic motor 23 is energized, a piezo crystal contracts with a fixedly specified frequency and moves the friction lug 48 along a track which brings about a displacement of the respective optical element 11, 12 along the x-axis. The direction of movement can be reversed by the manner in which the piezo-ultrasonic motor 23 is actuated.

In principle, mechanical apparatuses or structural elements that delimit the displacement path may be present in all embodiment variants shown.

Figure 14:
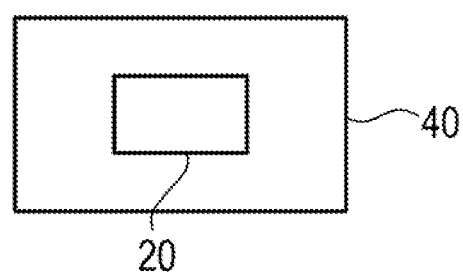

FIG. 14 schematically shows an optical device 40, for example a lens or a camera or an optical observation device or a display apparatus. The optical device 40 includes at least one optical assembly 20 according to the disclosure, for example one of the optical assemblies 20 described above in conjunction with FIGS. 3 to 13.

It is understood that the foregoing description is that of the preferred embodiments of the invention and that various changes and modifications may be made thereto without departing from the spirit and scope of the invention as defined in the appended claims.

LIST OF REFERENCE SIGNS

1 Guide component
2 Front side
3 Back side
4 Central axis
5 First sliding guide surface
6 Second sliding guide surface
7 First surface normal
8 Second surface normal
9 Further sliding guide surface
10 Surface normal
11 First optical element
12 Second optical element
13 Optically effective structural element/optical free-form element
14 Free-form surface
15 Plane surface
17 Mount
18 Sliding guide surface
19 Sliding guide surface
20 Optical assembly/wavefront manipulator
21 Optical axis
22 Bar
23 Drive
24 Elevation
25 Depression
29 Pin
31 Cylindrical surface
32 Piezo-ceramic
34 Friction ring
35 Rolling-element bearing
36 Driver
39 Through opening
40 Optical assembly
45 Rack
46 Rolling-element bearing 48 Friction lug
49 Friction rail

What is claimed is:

1. A guide component for joint guidance of at least two optical elements that are movable in relation to one another, the at least two optical elements including a first optical element and a second optical element, the guide component comprising:

at least two separate planar sliding guide surfaces arranged with a fixed spatial alignment relative to one another;

said at least two separate planar sliding guide surfaces including a first sliding guide surface defining a first surface normal and configured to rest against and slidingly guide the first optical element in relation to the second optical element;

said at least two separate planar sliding guide surfaces further including a second sliding guide surface defining a second surface normal and configured to rest against and slidingly guide the second optical element in relation to the first optical element; and, said first surface normal and said second surface normal running parallel to one another in opposite directions.

2. The guide component of claim 1, wherein said at least two separate planar sliding guide surfaces further include at least one further guide surface.

3. The guide component of claim 1, wherein said first sliding guide surface forms a first stop for the first optical element in a first direction; said second guide surface forms a second stop for the second optical element in a second direction; the guide component comprises a third guide surface forming a third stop for the first optical element in a third direction and a fourth guide surface forming a fourth stop for the second optical element in a fourth direction; the first direction is perpendicular to the third direction; and, the second direction is perpendicular to the fourth direction.

4. The guide component of claim 2, wherein said at least one further guide surface is embodied as a polished ceramic bar or pin.

5. An optical element comprising at least one optical element sliding guide surface for guiding the optical element along one of said first sliding guide surface and said second sliding guide surface of the guide component of claim 1.

6. The optical element of claim 5 further comprising a mount and the at least one optical element sliding guide surface being arranged on said mount.

7. The optical element of claim 5 further comprising an optically effective structural element and one of said first sliding guide surface and said second sliding guide surface being embodied as a portion of said optically effective structural element.

8. The optical element of claim 5 further comprising at least one of: an optical free-form element, a changeable stop, a gap, a target marker, an optical grating, a wedge, a plane plate, a prism, and a lens.

9. An optical assembly comprising:

a first optical element and a second optical element movable in a jointly guided manner and moveable in relation to one another;

a guide component including at least two separate planar sliding guide surfaces arranged with a fixed spatial alignment relative to one another;

said at least two separate planar sliding guide surfaces including a first sliding guide surface defining a first surface normal and configured to rest against and slidingly guide the first optical element in relation to the second optical element;

said at least two separate planar sliding guide surfaces further including a second sliding guide surface defining a second surface normal and configured to rest against and slidingly guide the second optical element in relation to the first optical element;

said first surface normal and said second surface normal running parallel to one another in opposite directions;

said first optical element including a first optical element sliding guide surface for sliding along said first sliding guide surface;

said second optical element including a second optical element sliding guide surface for sliding along said second sliding guide surface; and, said first optical element and said second optical element being configured to be jointly moveable in a guided manner via said guide component and to be moved in relation to one another via corresponding ones of said first sliding guide surface and said second sliding guide surface.

10. The optical assembly of claim 9, wherein said first optical element and said second optical element are adapted to one another.

11. The optical assembly of claim 10, wherein said first optical element and said second optical element are embodied as an optical free-form element pair.

12. The optical assembly of claim 9 further comprising at least one drive configured to move at least one of said first optical element and said second optical element in relation to said guide component.

13. The optical assembly of claim 12, wherein said drive includes at least one of a piezo-drive, an electric motor, and a gearing.

14. The optical assembly of claim 12, wherein said drive includes at least one of a piezo-walk drive, a rotational piezo-ultrasonic motor, a linear piezo-ultrasonic drive, a DC motor, a stepper motor, a rack-and-pinion gear, and, a lever-type gear.

15. A wavefront manipulator comprising the optical assembly of claim 9.

16. An optical device comprising the optical assembly of claim 9.

17. An optical device comprising the wavefront manipulator of claim 15.

18. The optical device of claim 16, wherein the optical device is a waveguide or a lens or a camera or an optical observation device or a display apparatus.

19. A method for operating an optical assembly having a first optical element and a second optical element movable in a jointly guided manner and moveable in relation to one another; the optical assembly further having a guide component including at least two separate planar sliding guide surfaces arranged with a fixed spatial alignment relative to one another; the at least two separate planar sliding guide surfaces including a first sliding guide surface defining a first surface normal and configured to rest against and slidingly guide the first optical element in relation to the second optical element; the at least two separate planar sliding guide surfaces further including a second sliding guide surface defining a second surface normal and configured to rest against and slidingly guide the second optical element in relation to the first optical element; the first surface normal and the second surface normal running parallel to one another in opposite directions; the first optical element including a first optical element sliding guide surface for sliding along the first sliding guide surface; the second optical element including a second optical element sliding guide surface for sliding along the second sliding guide surface; the first optical element and the second optical element being configured to be jointly moveable in a guided manner via the guide component and to be moved in relation to one another via corresponding ones of the first sliding guide surface and the second sliding guide surface; the method comprising at least one of:

jointly moving the first optical element and the second optical element in a guided manner via the guide component; and, moving the first optical element in a guided manner in relation to the second optical element by sliding the first optical element along the first sliding guide surface.

20. A method for producing a guide component of claim 1, the method comprising:

ablating at least the first sliding guide surface and the second sliding guide surface from a component.

21. A method for producing an optical element of claim 5, the method comprising:

ablating the optical element sliding guide surface for guiding the optical element from an optically effective structural element of the optical element or a mount of the optical element or a sliding element.

22. The method of claim 21, wherein the optical element includes a free-form surface and the optical element sliding guide surface is ablated in defined fashion in relation to the free-form surface.

* * * * *